United States Patent [19]
Grosseau

[11] 3,851,912
[45] Dec. 3, 1974

[54] VEHICLE WITH FLAT FRAME STRUCTURE

[75] Inventor: Albert Grosseau, Chaville, France

[73] Assignee: Societe Anonyme Automobiles Citroen, Paris, France

[22] Filed: Feb. 20, 1973

[21] Appl. No.: 333,658

[30] Foreign Application Priority Data
Feb. 28, 1972  France .............................. 72.06711

[52] U.S. Cl. ......... 296/35 R, 267/63 R, 280/106 R, 296/28 F
[51] Int. Cl. ....................... B62d 21/02, B62d 27/04
[58] Field of Search ............... 296/28 F, 28 J, 35 R; 280/106 R; 267/63 R

[56] References Cited
UNITED STATES PATENTS
3,177,031  4/1965  Schilberg ...................... 296/35 R X
3,321,236  5/1967  Sewelin ............................ 296/35 R FOREIGN PATENTS OR APPLICATIONS
627,956  9/1961  Canada .......................... 280/106 R
752,506  7/1956  Great Britain ................. 280/106 R Primary Examiner—Robert J. Spar
Assistant Examiner—Leslie J. Paperner
Attorney, Agent, or Firm—Stevens, Davis, Miller & Mosher

[57] ABSTRACT

The vehicle comprises a chassis including a substantially flat frame for fixing the means for holding the front and rear wheels (or front and rear axles), and a body connected to the chassis by elastic elements adapted to filter noise and vibration. The frame of the chassis is thin and has high self-rigidity in its plane. The body is arranged so as to withstand, without notable deformation, torsion forces around the longitudinal direction of the vehicle and flexion forces under vertical load. The elastic linking elements between the body and the chassis are arranged to prevent, in practice, any vertical relative displacement and to enable slight relative longitudinal movement between the chassis and the body. The assembly is such that the body, fixed to the chassis opposes buckling of the latter.

11 Claims, 5 Drawing Figures

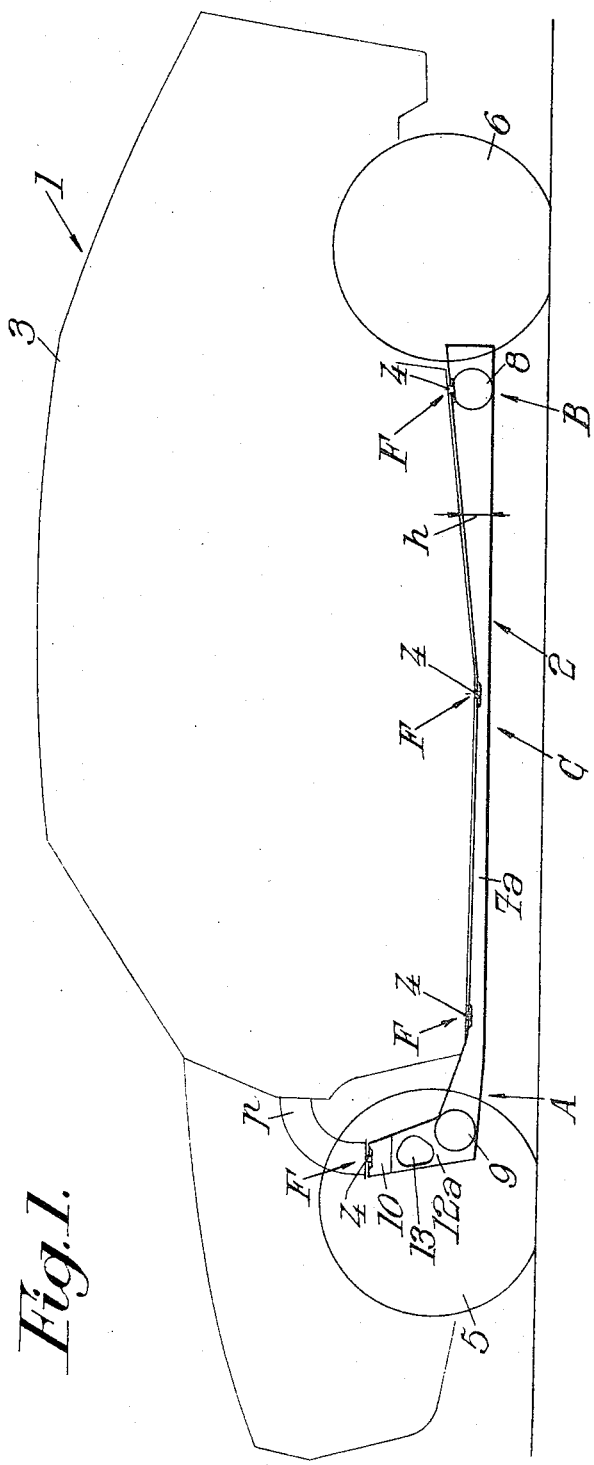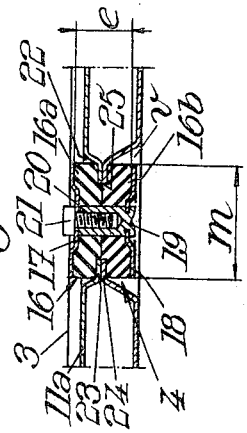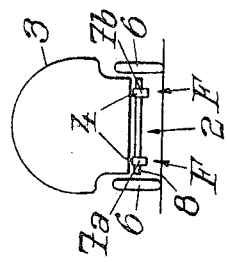

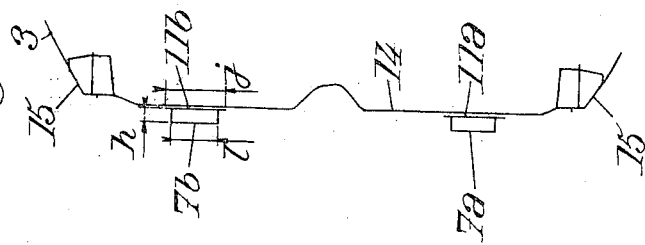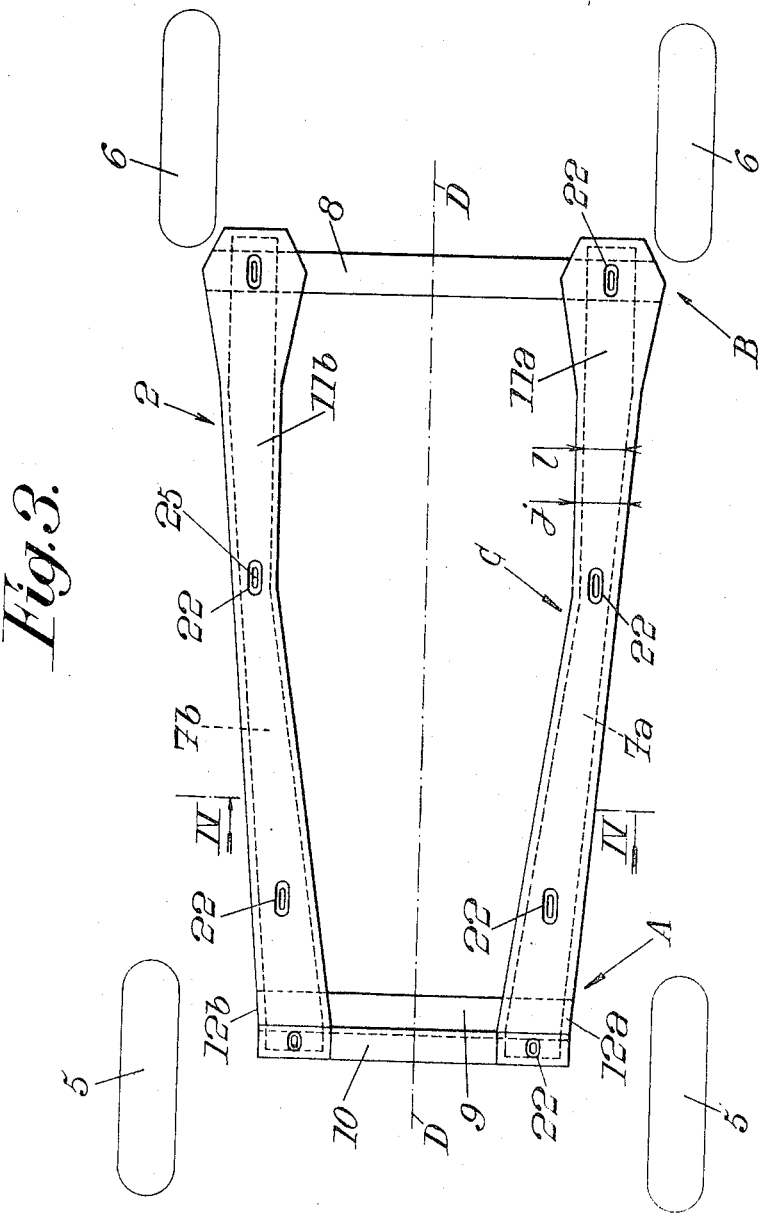

VEHICLE WITH FLAT FRAME STRUCTURE

The invention relates to improvements in or to vehicles of the type which comprise, on one hand, a chassis comprising a substantially flat frame on which are intended to be fixed means for holding front and rear wheels (or front and rear axles) and, on the other hand, a body connected to the chassis by elastic elements adapted to filter noise and vibration transmitted from the chassis to the body.

The invention relates more particularly, because it is in this case that its application seems to offer most advantage, but not exclusively, to passenger automobiles.

It is an object of the invention, to render the abovesaid vehicles such that they respond to the various exigencies of practice better than hitherto and especially such that, on one hand, they have properties of rigidity adapted to ensure good safety and good running stability and that, on the other hand, they satisfy the requirements of comfort by offering good sound insulation and good accommodation, the means used for obtaining these results having to be light and of small bulk.

According to the invention, a vehicle of the type set forth is characterized by the fact that the frame of the chassis is thin and offers high self-rigidity in its plane, that the body is arranged so as to resist any notable deformation to torsion forces around the longitudinal direction of the vehicle and to flexion forces under vertical load, and that the elastic connecting elements between the body and the chassis are arranged to prevent, in practice, any vertical relative displacement and to enable slight longitudinal relative clearance between the chassis and the body, the assembly being such that the body, fixed to the chassis, opposes buckling of the latter.

In practice, the height of the shortest cross-section of the chassis, between the two front and rear zones of attachment of the axle respectively, is less than a fortieth (1/40) of the longitudinal distance separating these two zones.

Preferably, the vertical dimension of the frame, is less in the central portion of this frame than at its two longitudinal ends.

Generally, the frame comprises two longitudinal members of low height, and the cross-section of these longitudinal members is reduced both in width and in height, in their central portion, with respect to the cross-sections of the end parts.

Preferably, the height of the longitudinal members is less than their width and, in the central portion of the longitudinal members, this height is less than one half of the width.

Advantageously, the width of the longitudinal members, at their longitudinal ends, is sufficient to ensure, especially by welding, good interlocking between these longitudinal members and the front and rear transverse members completing the frame.

The elastic connecting elements between the chassis and the body can be constituted by blocks of elastomeric material whose thickness is less than their dimension in the longitudinal direction of the vehicle. Preferably, these blocks are housed in cavities provided in the frame.

The invention consists, apart from the features disclosed above, of certain other features which will be more explicitly considered below with regard to one embodiment of the invention which will be described in detailed manner with reference to the accompanying drawings, but which is in no way limiting.

FIG. 1 of these drawings is a diagrammatic view, in side elevation, of a vehicle according to the invention.

FIG. 2 is a diagrammatic view in end elevation, on a reduced scale, of the vehicle of FIG. 1.

FIG. 3 is a plan view of the chassis of the vehicle.

FIG. 4 is a diagrammatic section along IV—IV of FIG. 3, in which the contour of the body is outlined.

FIG. 5, finally, shows in detail, an elastic connecting element between chassis and body.

Referring to FIG. 1, there can be seen a vehicle 1 comprising, on one hand, a chassis 2 and on the other hand, a body 3 connected to the chassis 2 by elastic elements 4 adapted to filter noise and vibration transmitted from the chassis 2 to the body 3.

Holding, i.e., mounting means (not shown) for the front 5 and rear 6 wheels, or front and rear "axles," are rigidly fixable to the chassis 2.

The chassis 2 is constituted by a substantially flat thin frame, offering high self-rigidity in its plane. The dimension $h$ (FIG. 1) of the frame in the vertical direction is smaller in the central portion C of this frame and has two longitudinal ends A and B.

The word "frame" used in this patent application with regard to the chassis of the vehicle, denotes both a platform as well as an assembly of longitudinal and cross members.

By thin frame is denoted according to the invention, a frame whose thickness is insufficient to permit it to ensure alone torsional and flexural rigidity of the vehicle, whilst guaranteeing the longitudinal rigid solidarization between the front and rear axles.

In practice in a thin frame, according to the invention, the height of the smallest crosssection of the chassis, between the two zones of attachment of the axles at the front and rear respectively, is less than a fortieth (1/40th) of the longitudinal distance separating these two zones.

As seen in FIG. 3, the frame comprises two longitudinal members 7a, 7b of low height, the height of the longitudinal members being identical with the dimension $h$ of the frame. The width 1 (FIG. 3) of these longitudinal members is minimal in the central portion C and maximal at the two longitudinal ends A and B of the chassis 2. The cross-section of the longitudinal members 7a, 7b is hence reduced both in height and in width in said central portion C. These longitudinal members 7a, 7b are symmetrical with one another with respect to the longitudinal axis D—D of the vehicle and have concurrent average longitudinal directions from rear to front of the vehicle. A rear transverse member 8 which connects the rear ends of the longitudinal members and which is perpendicular to the axis D—D is longer than the transverse members 9 and 10 which connect the front portions of the said longitudinal members, the members 9 and 10 being parallel to the transverse member 8. As seen in FIG. 4, the longitudinal members 7a, 7b have a hollow rectangular cross-section with the larger sides horizontal. Their upper portions 11a, 11b are constituted by plates of sheet metal of width $j$ which is greater than that $l$ of the longitudinal members, so that this plate terminates on each side of the associated longitudinal member.

Preferably, the height $h$ of the longitudinal members is less than their width $l$ and in the central portion C of the longitudinal members, this height $h$ is less than half the width $l$.

The transverse members 8 and 9, whose axes are situated substantially at the same level, are constituted by two tubes.

The front portions 12a and 12b of the longitudinal members 7a, 7b are raised i.e. upwardly inclined and connected, at their upper ends, by the transverse member 10, of trapezoidal cross-section. The front portions 12a, 12b constitute in a way the uprights in the form of a hollow casing. An opening 13, with curvilinear triangular contour, is porvided in the lateral side plates of the parts 12a, 12b, especially to facilitate assembly and disassembly operations of mechanical members not shown. Each opening 13 is situated between the two transverse members 9 and 10.

By reason of the width of the longitudinal ends of the longitudinal members 7a, 7b, the assembly, especially by welding, of the latter with the transverse members 8, 9 and 10 is good and the frame 2 offers high rigidity in its plane.

The rear transverse member 8 supports, at least partly, the rear axle, that is to say the means for mounting the rear wheels 6. The means for mounting the front wheels 5 are fixed to the front part of the frame 2. The transverse members 9 and 10, superposed, form a protective screen between, on the one hand, the front axle and the engine drive unit and, on the other hand, the cab.

The two zones of the attachment of the axles at the front and rear respectively, which have been previously considered, are situated therefore at the level, in the longitudinal direction of the vehicle, of the transverse members 9, 10 on the one hand, for the front axle, and 8 on the other hand for the rear axle.

The body 3 has a self-rigidity enabling it to withstand without notable deformation torsion forces around the longitudinal direction or axis D-D of the vehicle and flexion forces under vertical load. As seen in FIG. 4, the floor 14 of the body 3 is connected, by means of elastic elements (not shown in FIG. 4, but seen in FIGS. 1, 2 and 5), on the upper parts 11a, 11b of the longitudinal members.

The body 3 is rigidified by ribs such as the longitudinal ribs 15, with hollow polygonal crosssection, seen in FIG. 4.

The body 3 is fixed at several points F on the longitudinal members 7a, 7b of the frame 2, by elastic connecting elements 4. For example as seen in FIG. 1, there is provided on each side, four fixing points F. Advantageously, the body 2 comprises, at the front of each side, a curved (FIG. 1) rigid leg (or arm) $p$ intended to be fixed to the upper portion of the uprights 12a, 12b of the frame 2, by a connecting element 4.

Each elastic connecting element 4 between the body and the chassis is arranged to prevent practically any relative vertical movement and to enable slight longitudinal relative play between the chassis 2 and the body 3.

As seen in FIG. 5, a connecting elastic element 4 comprises a block 16 of elastomeric material, whose thickness $e$ is small with respect to its dimension $m$ in the longitudinal direction D—D. The block 16 comprises two parts 16a, 16b, clamped to one another, and symmetrical with respect to their plane of contact. The block 16 is supported, at its upper portion, against a metallic plate 17 fast to the body 3, whilst the lower portion of the block 16 is in abutment against a metallic plate 18. This plate 18 is fast to a cylindrical metallic core 19, of vertical axis, passing throgh the two parts 16a, 16b, in their central zone. This core 19 comprises a threaded blind hole 20 opening at the upper portion of said core. The screw 21, of which the stem passes through a hole provided in the plate 17, is screwed into the hole 20 and ensures the fixing of the core 19 to said plate 17, and the clamping of the parts 16a, 16b between the plates 17 and 18.

The cavities 22 are provided in the longitudinal members 7a, 7b to serve as housings for the blocks of elastomeric material 16 so as to reduce the bulk of the assembly. Each cavity 22 is obtained by deforming the upper surface and the lower surface of the longitudinal members so as to form cups whose bottoms 23, 24 touch. These bottoms are pierced by a hole 25 for the passage of the block of elastomeric material 16. The bottoms 23, 24 form two rims gripped between the parts 16a, 16b, of the block of elastomeric material. As seen in FIG. 5, there exist free spaces $v$ between the walls of the block 16 and the inclined walls of the cavity 22 so that the block 16 can be deformed in the longitudinal direction by reason of the free space which is available to it.

The elastic connecting elements 4 hence enable, by their deformation in the longitudinal direction, a slight relative play between the chasssis and the body, and prevent practically any vertical relative displacement between said chassis and the body.

The behaviour of a vehicle arranged according to the invention is as follows.

The frame 2, by reason of its own rigidity in its plane, resists principally forces parallel to the longitudinal direction D—D of the vehicle, and opposes angular deformations which are manifested by a variation of the angles formed between the transverse members, 9, 10 and 8 and the longitudinal members 7a, 7b (FIG. 3). This resistance to angular deformation is due, to a great extent, to good rigidification between said longitudinal and transverse members.

This resistance to angular deformation is an important characteristic for road holding, since it is manifested by the constancy of angular position of the axles, fixed to the frame 2, with respect to the longitudinal axis D—D of the vehicle, hence with respect to the direction of movement of the vehicle. This characteristic affects the directional stability and a vehicle according to the invention will hence have good directional stability.

The body 3 has a sufficient rigidity to resist, without substantial deformation, torsion forces around the axis D—D, and vertical flexion forces. The fixing of the body 3 to the frame 2, by means of connecting elements 4, ensures good rigidification of the frame 2 to buckling so that the said frame 2 can withstand forces of thrust and of longitudinal traction between the axles, despite its low height in its central portion.

The fixing elements 4, enable slight longitudinal relative play between the body 3 and the frame 2, ensuring filtration of noise and of vibration which are due on one hand, to shock from the wheels 5 and 6 against obstacles or roughness of the road and on the other hand, to operation of the engine drive unit fixed to the frame 2. It should be noted that the longitudinal vibrations, the essential cause of noises in the cab, are accurately filtered to the maximum by the elements 4.

A vehicle according to the invention has the following advantages:

ease of assembly in manufacture, the body 3 being applied from above to the mechanical assembly of the chassis 2, axles, engine-drive unit, safety in case of accident through frontal shock since the frame resists movement of the rear axle towards the legs of the rear passengers and the relative backward movement of the engine-drive unit towards the cab, sound insulation of the cab with respect to the mechanical members, so that good sound proofing and habitability conditions result therefrom.

The vehicle is furthermore light and can have, for a given vertical clearance, a relatively low floor in spite of the presence of a chassis, by reason of the reduced bulk, in height, of the frame 2.

The road stability (road holding and steering) is excellent by reason of the constancy of position of the axles with respect to the longitudinal axis D—D of the vehicle.

The resistance to front crushing is good by reason of the presence of the frame 2.

A vehicle according to the invention hence enables the combination of the advantages obtained on one hand, by a self-supporting body (lightness, small deformation both in flexion and in torsion, resistance to lateral shock), on the other hand, through a chassis, (relative geometry of the axles not disturbed by the interposition of elastic elements, good resistance to frontal shock) whilst eliminating their respective defects.

I claim:

1. Vehicle comprising a chassis including a substantially flat, relatively thin, frame on which are fixable wheel-mounting means at front and rear zones respectively, a body, elastic elements connecting said body to said chassis and adapted to filter noise and vibration which may be transmitted from the chassis to the body, said frame having self-rigidity in its plane, the body being substantially undeformable by torsion forces around the longitudinal direction of the vehicle and flexion forces under vertical load, said elastic connecting elements between the body and the chassis being arranged to prevent practically any vertical relative displacement and to permit slight relative longitudinal movement between the chassis and the body, the assembly being such that the body, fixed to the chassis resists buckling of the chassis, the smallest cross-sectional height of the chassis, between the two zones of attachment of the wheel-mounting means being less than a fortieth (1/40th) of the longitudinal distance separating said front and rear zones.

2. Vehicle according to claim 1, wherein the front parts of the longitudinal members are upwardly inclined and connected by two transverse members situated at different levels.

3. Vehicle according to claim 1, wherein the dimension of the frame, in the vertical direction is less in the central portion of this frame than at its two longitudinal ends.

4. Vehicle according to claim 1, in which the frame comprises two longitudinal members, wherein the longitudinal members are low in height and their cross-section is reduced, both in width and in height, in their central portion, with respect to the crosssections of the end portions.

5. Vehicle according to claim 4, wherein the longitudinal members are wide at their longitudinal ends and are welded at said ends to provide good interlocking between these longitudinal members and front and rear transverse members completing the frame.

6. Vehicle according to claim 4, wherein the height of the longitudinal members is less than the width and, in the central portion of the longitudinal members, the height is less than half the width of said longitudinal members.

7. Vehicle according to claim 1, wherein the elastic connecting elements between the chassis and the body are constituted by units of elastomeric material whose thickness is less than their dimension in the longitudinal direction of the vehicle.

8. Vehicle according to claim 7, wherein the longitudinal members comprise cavities adapted to serve as housings for the units of elastomeric material.

9. Vehicle comprising a chassis including a substantially flat, relatively thin, frame comprising longitudinal members on which are fixable wheel-mounting means at front and rear zones respectively, a body, elastic elements connecting said body to said chassis and adapted to filter noise and vibration which may be transmitted from the chassis to the body, said frame having high self-rigidity in its plane, the body being substantially undeformable by torsion forces around the longitudinal direction of the vehicle and flexion forces under vertical load, said elastic connecting elements between the body and the chassis being arranged to prevent practically any vertical relative displacement and to permit relative longitudinal movement between the chassis and the body, the assembly being such that the body, fixed to the chassis resists buckling of the chassis, wherein the elastic connecting elements between the chassis and the body are constituted by units of elastomeric material whose thickness is less than their dimension in the longitudinal direction of the vehicle, the longitudinal members comprise cavities adapted to serve as housings for the units of elastomeric material and each cavity of a longitudinal member is formed by two cups provided in the upper and lower surfaces of the longitudinal member and whose bottoms touch, the bottoms of these cups being pierced by a hole for the passage of the unit of elastomeric material.

10. Vehicle according to claim 9, wherein each unit of elastomeric material comprises two parts between while the bottoms of the cups are gripped, said parts being gripped between two plates one of which is fast to the body.

11. Vehicle comprising a chassis including a substantially flat, relatively thin, frame comprising longitudinal members on which are fixable wheel-mounting means at front and rear zones respectively, a body, elastic elements connecting said body to said chassis and adapted to filter noise and vibration which may be transmitted from the chassis to the body, said frame having high self-rigidity in its plane, the body being substantially undeformable by torsion forces around the longitudinal direction of the vehicle and flexion forces under vertical load, said elastic connecting elements between the body and the chassis being arranged to prevent practically any vertical relative displacement and to permit slight relative longitudinal movement between the chassis and the body, the assembly being such that the body, fixed to the chassis resists buckling of the chassis, wherein the front parts of the longitudinal members are upwardly inclined and connected by two transverse members situated at different levels and, wherein the body comprises, at the front on each side, a curved leg adapted to be fixed to said upwardly inclined parts situated on the same side of the vehicle as the leg through an elastic connecting element.

* * * * *